UNITED STATES PATENT OFFICE.

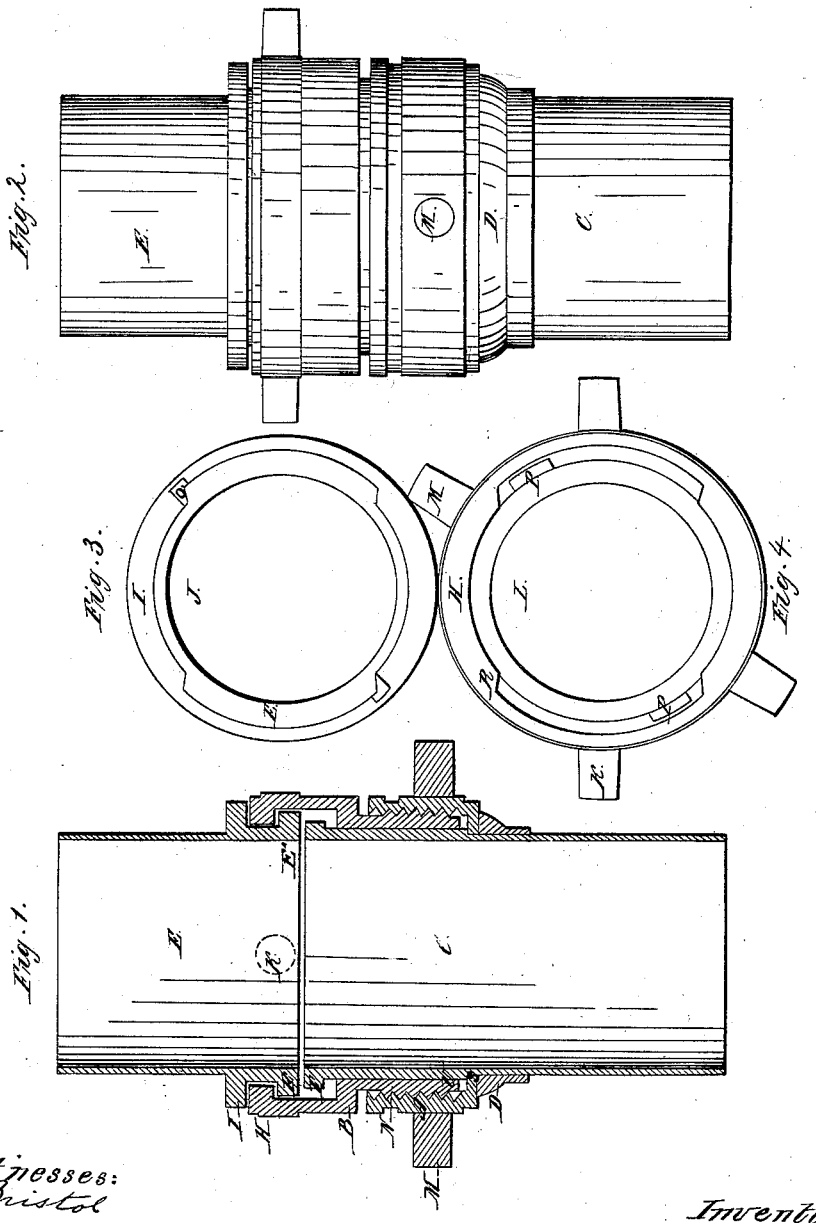

ROBT. HENEAGE, OF BUFFALO, NEW YORK.

IMPROVEMENT IN HOSE-COUPLINGS.

Specification forming part of Letters Patent No. 56,223, dated July 10, 1866.

*To all whom it may concern:*

Be it known that I, ROBERT HENEAGE, of Buffalo, in the county of Erie and State of New York, (assignor to himself and Edwin Gilbert,) have invented certain new and useful Improvements in Hose-Couplings; and I do hereby declare that the following is a full and exact description thereof, reference being had to the accompanying drawings, and to the letters marked thereon.

The nature of my invention consists in providing a simple and ready means for coupling hose, which is peculiarly adapted to the hose connected or attached to locomotive and fire engines.

It has long been the great desideratum of inventors and manufacturers in this branch of mechanics to provide some device by which hose might be quickly and securely joined or coupled—a difficulty that has always been encountered from the fact that those heretofore used become loose and out of order.

To enable others skilled in the art to make and use my invention, I will proceed to describe its construction and operation.

I construct my coupling of brass—the usual and most suitable material.

The same letters in the several figures represent similar parts in each.

Figure 1 is a sectional view, cut lengthwise through the center of the coupling, showing the manner in which it is locked or fastened together, also the screw for either tightening it when a close joint is required or loosening it when necessary to detach or separate it. Fig. 2 is a side elevation, showing the coupling complete and fastened together. Figs. 3 and 4 are plan views, showing the flanges by which the coupling is locked together, also the wrench-pins by which the screw is turned while tightening or loosening it, and the stops which prevent the flanges from turning too far around or past each other while locking together.

In Fig. 1, C and E are the two halves of the coupling. E′ E′ and H H are the flanges which lock the two halves together. Their form or shape is better shown in Figs. 3 and 4.

B is a tube which surrounds the tube or that part of the coupling marked C. It is made to move to and fro lengthwise on the tube C, and is kept from turning around on said tube by a groove cut lengthwise on its inner side and a pin which is fastened to the tube C at or near the point N, the point of which pin projects outward from the tube C and into the said groove, thus allowing the tube B to move lengthwise of the tube C, and at the same time prevent it from turning around it.

A is a nut which moves the tube B lengthwise along the tube C when turned.

S is a flange which moves in a groove surrounding the tube C. It is a part of the nut A, and keeps it from moving lengthwise of the tube C while being turned. D and U represent the parts that form said groove.

M M and K K represent the wrench-pins by which the nut A is turned.

O O in Fig. 3 and P P in Fig. 4 are stops, which prevent the flanges E′ E′, as shown in Fig. 3, and H H, as shown in Fig. 4, from turning too far, or past each other while being locked together.

I I is a flange or rib surrounding the tube E.

It is operated as follows: The two parts E and C are put together as shown in Fig. 1. The part or tube E is then turned until the flanges E′ E′ pass under the flanges H H in the tube C, and are stopped by the stops O O, as shown in Fig. 3, and P P, as shown in Fig. 4. The nut A is now turned, which draws the tube B and the flange H, which forms a part of it, down upon the flange E′, thus drawing the tubes E and C together and closing the joint. A packing of leather, rubber, or any other suitable material is used when a tight joint is wanted. It is released by a reverse action of the screw and the tube E.

What I claim as my invention, and desire to secure by Letters Patent, is—

In combination with the several parts of the coupling, constructed and arranged substantially as described, the stops P P, as and for the purposes set forth.

ROBT. HENEAGE.

Witnesses:
 JAMES SANGSTER,
 S. O. GOULD.